United States Patent
Yan

(10) Patent No.: US 11,435,239 B2
(45) Date of Patent: Sep. 6, 2022

(54) METHOD FOR ESTIMATING A TIME-VARIABLE MEASUREMENT VARIABLE OF A SYSTEM

(71) Applicant: Vorwerk & Co. Interholding GmbH, Wuppertal (DE)

(72) Inventor: Wenjie Yan, Düsseldorf (DE)

(73) Assignee: Vorwerk & Co. Interholding GmbH, Wuppertal (DE)

(*) Notice: Subject to any disclaimer, the term of this patent is extended or adjusted under 35 U.S.C. 154(b) by 818 days.

(21) Appl. No.: 16/318,945

(22) PCT Filed: Jul. 20, 2017

(86) PCT No.: PCT/EP2017/068337
§ 371 (c)(1),
(2) Date: Jan. 18, 2019

(87) PCT Pub. No.: WO2018/015485
PCT Pub. Date: Jan. 25, 2018

(65) Prior Publication Data
US 2019/0285486 A1    Sep. 19, 2019

(30) Foreign Application Priority Data
Jul. 21, 2016 (DE) .................. 10 2016 113 494.5

(51) Int. Cl.
*G01K 7/42* (2006.01)

(52) U.S. Cl.
CPC .............. *G01K 7/427* (2013.01); *G01K 7/42* (2013.01); *G01K 2207/06* (2013.01); *G01K 2207/08* (2013.01)

(58) Field of Classification Search
CPC ...... G01K 7/427; G01K 7/42; G01K 2207/06; G01K 2207/08; H05B 2213/07
See application file for complete search history.

(56) References Cited

U.S. PATENT DOCUMENTS 6,462,316 B1  10/2002  Berkcan et al.
9,109,960 B2 *  8/2015  Sladecek .............. A47J 36/321

FOREIGN PATENT DOCUMENTS

| CN | 107192476 A | 9/2017 |
| EP | 2388561 A1 | 11/2011 |
| EP | 2388564 A1 | 11/2011 |

OTHER PUBLICATIONS

Examination Report for European Application No. 17751651.5 dated Jul. 13, 2020, with its English translation, 9 pages.
(Continued)

*Primary Examiner* — Leslie J Evanisko
*Assistant Examiner* — Leo T Hinze
(74) *Attorney, Agent, or Firm* — Rudy J. Ng; Bret E. Field; Bozicevic, Field & Francis LLP

(57) ABSTRACT

The invention relates to a method (100) for estimating (150) a temporally variable measurement variable of a system, in particular a temperature in a vessel (24), preferably in a food processor (10) for the at least partially automatic preparation of food, wherein at least one measurement information (210.1) is determined by means of a measurement (130), which measurement information differs, at least depending on at least one system parameter (230), from the true value of the measurement variable.

18 Claims, 4 Drawing Sheets

(56) References Cited

OTHER PUBLICATIONS

Second Office Action for Chinese Application No. 201780032056.7 dated Dec. 2, 2020, with its English translation, 8 pages.
Examination Report for European Application No. 17751651.5 dated Dec. 11, 2020, with its English translation, 7 pages.
Office Action for Mexican Patent Application No. MX/a/2018/014415 dated Jul. 9, 2021, and its English summary, 8 pages.
Third Office Action for Chinese Application No. 201780032056.7 dated Jun. 16, 2021, with its English translation, 12 pages.
Office Action for Taiwan Application No. 106122548 dated Mar. 9, 2021, with its English translation, 14 pages.
Notification of First Office Action for Chinese Application No. 201780032056.7 dated Mar. 19, 2000, with its English translation, 14 pages.
Office Action for European Patent Application No. 17751651.5 dated Apr. 1, 2022, with its English summary, 5 pages.
Office Action for Australian Patent Application No. 2020289866 dated Mar. 15, 2022, 5 pages.

* cited by examiner

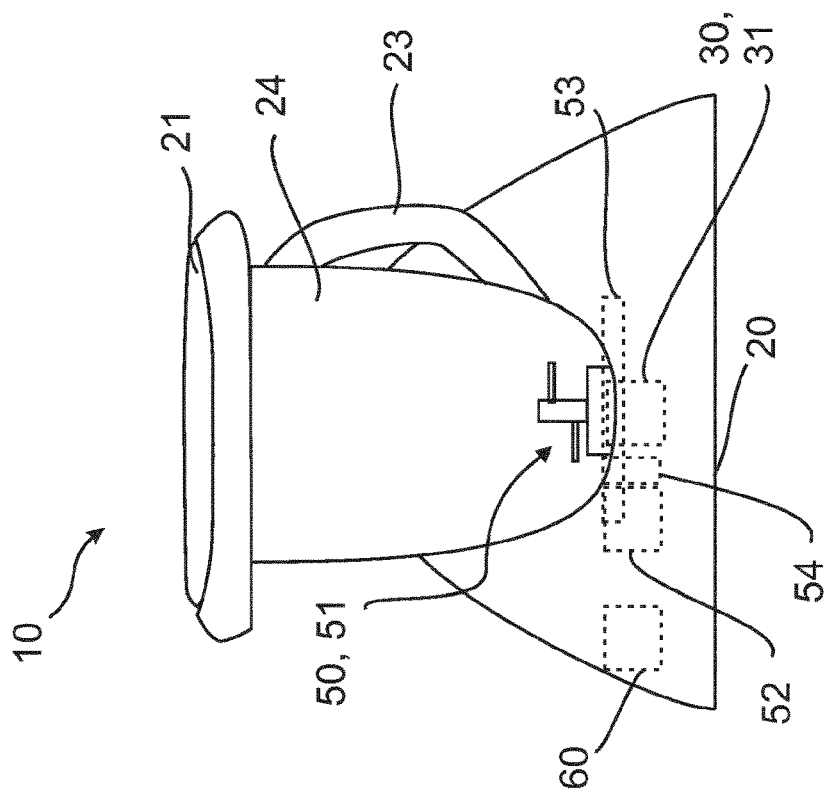
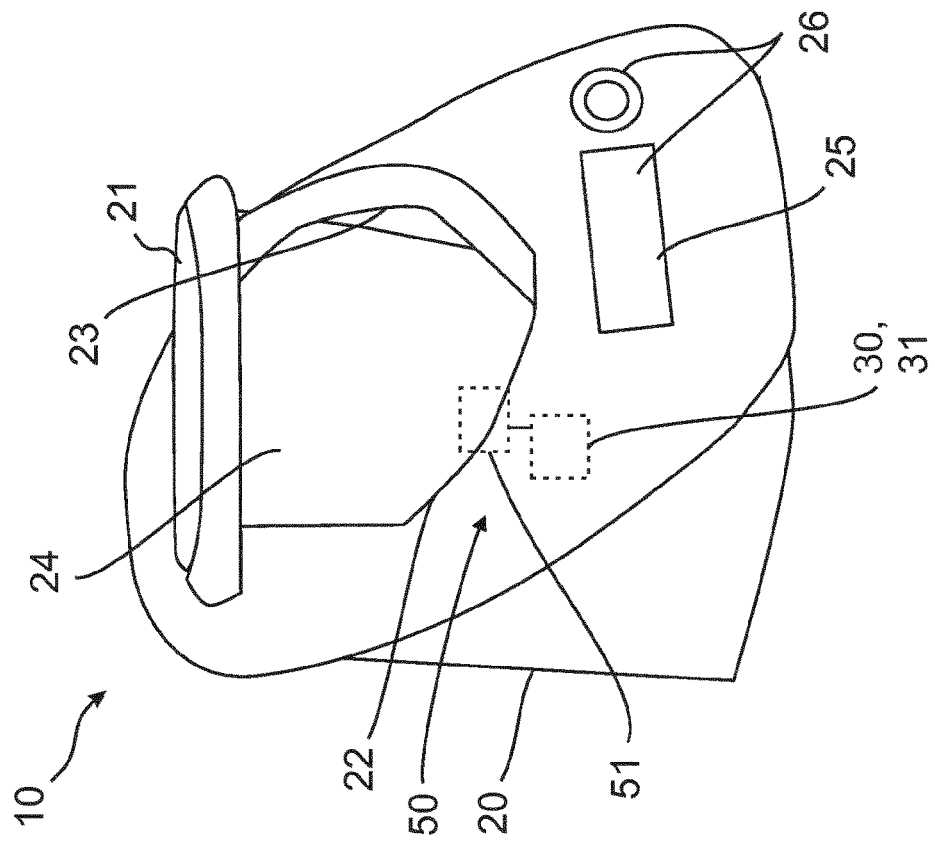
Fig. 1
Fig. 2

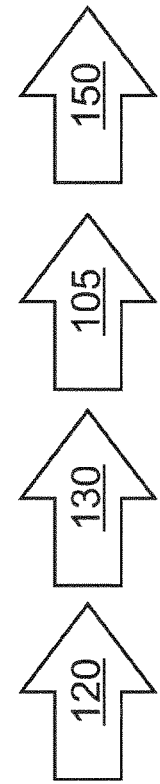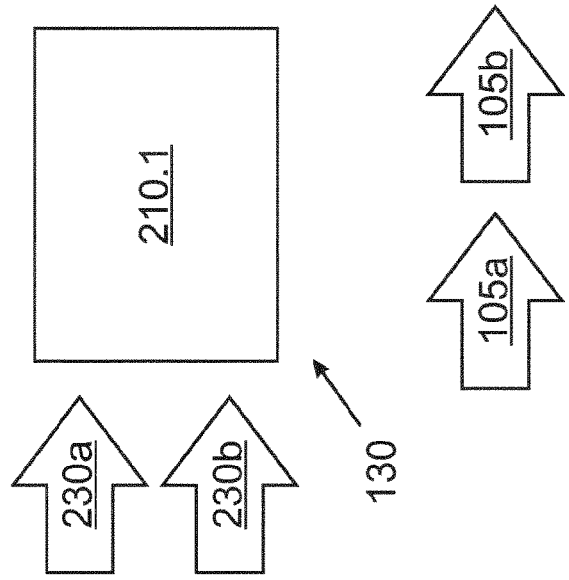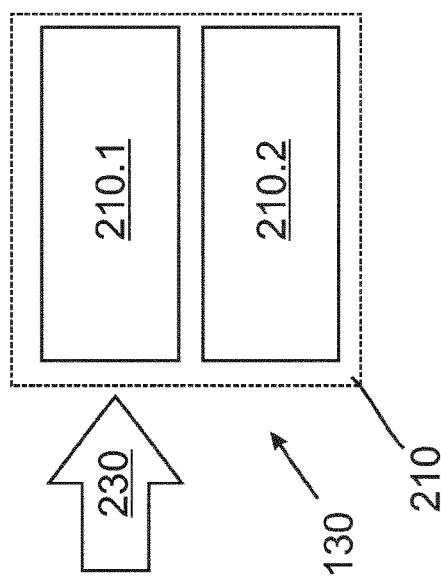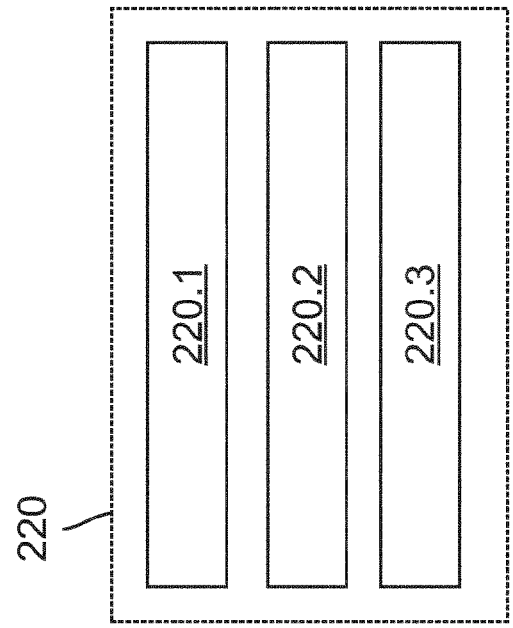
Fig. 7
Fig. 8
Fig. 5
Fig. 6

METHOD FOR ESTIMATING A TIME-VARIABLE MEASUREMENT VARIABLE OF A SYSTEM

The present invention relates to a method of the type that is defined in more detail according to the present disclosure.

The aim of a measurement is usually that of obtaining a quantitative statement regarding a measurement variable. In this case the measured value usually deviates from the true value of the measurement variable, said deviation in many cases being negligible or being able to be subtracted out in a simple manner. It is also known to use physical models in order to calculate or estimate the true value thereby and on the basis of at least one measured value. In this case, the influences required therefor, in particular system parameters, are generally well-known, can be estimated, or are negligible.

However, it is often problematic that, in the case of dynamic processes, the state of the dynamic system or the system parameters cannot be directly determined and/or can be observed only incompletely. It is particularly problematic if, in the case of a time-variable measurement variable of a (dynamic) system, there is a significant difference between the location of the measurement variable, and the measurement location at which a measurement information, e.g. the measured value, is determined.

It may therefore be necessary, for example, to measure the inside temperature in a vessel without it being possible for a sensor to be inserted into the interior of the vessel. For example, it is only possible for a sensor to be arranged on a heating plate that is provided for heating the vessel or the contents of the vessel. In this case, the temperature that can be measured by the sensor deviates significantly from the inside temperature of the vessel. This is complicated by the fact that said deviation is difficult or impossible to predict, because the deviation is dependent for example on the specific heat capacity of the contents of the vessel. The contents is for example at least one food that is prepared in the vessel and that is usually not known.

Said deviation is therefore influenced by a plurality of factors, said factors being referred to in the following as system parameters. Although it is conceivable for further sensors to be used to measure the inside temperature of the vessel, this would result in additional production costs and would be associated with complex and laborious manufacture and assembly.

It is therefore disadvantageous that, if a measurement variable cannot be directly measured by a sensor, high manufacturing outlay and/or assembly outlay and/or costs are usually necessary in order to approximate the true value (e.g. using further sensors). A further disadvantage is the fact that, in the prior art, it is often not possible to determine the deviation from the true value in a sufficiently accurate manner. This is the case in particular in conventional measurement methods for determining the temperature in the interior of a vessel of a food processor or in the interior, in particular the cooking chamber, of an oven.

An object of the present invention is therefore that of overcoming the above-described disadvantages at least in part. The object of the invention is in particular that of making it possible to determine the true value of a measurement variable in a simpler, more reliable and more accurate manner.

The above object is achieved by a method having the features of the present disclosure. Further features and details of the invention can be found in the relevant dependent claims, the description and the drawings.

The object is achieved in particular by a method for estimating an (in particular temporally) variable (for example first) measurement variable of a system. The measurement variable is preferably a temperature, in particular an inside temperature of a vessel or of an interior of an oven. The measurement variable is preferably a temperature in a vessel, particularly preferably in a food processor for at least partially automatic preparation of food. The food processor is preferably designed so as to have a heating function, in particular using a heating element, i.e. for example heating by means of a heating plate. In this case, the heating element and/or the heating plate is preferably arranged so as to be adjacent to the vessel, such that heat transmission into the interior of the vessel is possible, in particular for heating the food present in the interior of the vessel.

The system preferably relates to a dynamic process and/or a measurement system (and/or another dynamic system in which a measurement and/or heat transmission takes place), in particular in a domestic appliance, preferably in a food processor and/or in an oven. A temperature development and/or heat transmission preferably takes place in the system, preferably by means of heating using a heating element, preferably in a food processor and/or in an oven. The system is preferably to be considered a dynamic system and/or can preferably be described on the basis of a model (within specified limits or approximately).

In this case, it is possible for at least one measurement information (e.g. relating to the measured value or the further measurement variable) to be determined by means of a measurement (in particular of at least one further measurement variable), which measurement information differs, at least in accordance with at least one system parameter, from the true value of the measurement variable (or first measurement variable). In this case, the system parameter is for example a factor influencing said difference, i.e. influencing the deviation between the value of the measurement variable that can be determined on the basis of the measurement information, and the actual true value of the measurement variable. In this case, the system parameter is dependent in particular on the state of the system, in particular the dynamic system, and/or on a heat capacity, in particular of the food and/or of the contents in the vessel, and/or on a heat transfer between a measurement location of the measurement and a further location of the measurement variable, and/or a heat transfer coefficient, and/or a power for the heating process, i.e. of a heating element, and/or a property of the heating element, e.g. the mass of a heating plate, and/or a specific heat capacity of the heating plate, and/or an operation e.g. of the food processor. In particular, the measurement information may also comprise a first measurement information which is determined by a sensor for example, and/or a second measurement information which is determined on the basis of an operating information and/or an operator input, e.g. an input of a type of food prepared, and/or further measurement information, e.g. a weight of the food that is determined by scales.

In this case, it is preferable that, in order to estimate the true value (of the temporally variable measurement variable or first measurement variable), the following steps should be carried out, preferably in succession or in any desired sequence:

a) providing at least one or more system parameter suggestions which in each case differ from one another and each comprise a suggestion for at least one of the system parameters, preferably for each of the system parameters, b) checking the system parameter suggestions (or the relevant system parameter suggestions), wherein a performing of the measurement is executed repeatedly (in particular in a temporally successive manner) and/or (repeated) weighting is carried out on the basis of the measurement information determined in the process, such that an assessment of the system parameter suggestions is and/or can be provided, c) performing the estimation on the basis of at least one of the system parameter suggestions and/or on the basis of each of the system parameter suggestions, taking into account the assessment.

In this case, in particular according to step b), the measurement is executed repeatedly, such that the measurement information is determined again at each execution, and the weighting can be carried out on the basis of said measurement information. In other words, the measurement is carried out repeatedly, in order to acquire a current measured value in each case, which measured value is dependent on the true value of the temporally variable measurement variable. It is thus preferably possible, by means of the repeated execution of the measurement, to determine a temporal course of the measurement information, said specific progression being dependent on the at least one system parameter and the true value of the temporally variable measurement variable. Since in particular both the (true) system parameters and the true value of the measurement variable is unknown, the system parameter suggestions for example in each case propose a possible value for the system parameter, and/or a future value for the determined measurement information in the temporal course is proposed, i.e. for example calculated and/or predicted, on the basis of the system parameter suggestions in each case. The individual system parameter suggestions can preferably be checked by means of the predicted value being compared with the determined measurement information. It is then possible to check, as the criterion for the weighting, for example how strongly the predicted value corresponds to the determined measurement information, because it is e.g. assumed that, when the correspondence is strongest, the system parameter suggestion in question also corresponds most strongly to the true system parameter.

The method according to the invention is thus advantageous in particular in that it is possible to omit a structure comprising at least one sensor that directly acquires the measurement variable. Furthermore, it is advantageous in particular that unknown parameters can be estimated and assessed in a particularly simple and reliable manner. This allows for reliable estimation of the true value of the measurement variable. In this case, it is preferably possible for steps a) to c) to be carried out at least in part and/or exclusively by a processing apparatus, in particular an electronics and/or a processor. This allows for quick, cost-effective and reliable estimation of the true value of the measurement variable. It is preferably possible for the estimation to be carried out, after a few executions according to step b), on the basis of the system parameter having the best assessment.

It is conceivable that the system parameter suggestions and/or the system parameters are in each case parameters for a model, in particular for a process model and/or a stochastic model of the system dynamics of the system. In particular, it may therefore also be possible for the system parameters to be merely model parameters, and therefore all the system parameters can be used merely for approximating a true deviation between the true value of the measurement variable and the measurement information. In other words, it may be possible for the measurement information to differ from the true value of the measurement variable not only in accordance with the at least one system parameters, but in addition also in accordance with further influencing factors which are not taken into account for example. The steps of provision, according to step a), and/or checking, according to step b), and/or performing the estimation, according to step c), are therefore preferably dependent on said model, wherein in particular a prediction is made on the basis of the system parameter suggestion and/or the estimation is made on the basis of the model, in particular such that the system parameter suggestions are used as model parameters for the calculation. Therefore, in each case a model calculation is preferably carried out, using different model parameters (in accordance with the relevant system parameter suggestions), for each of the system parameter suggestions. In other words, (in particular) the same model, only with different model parameters, is used in each case, for the purpose of calculation, for each system parameter suggestion. In particular, for this purpose, the model that is used for steps a) to c) is selected in accordance with the system. This allows for a particularly reliable estimation of the true value of the temporally variable measurement variable.

The measurement variable is preferably temporally variable in that the measurement variable is actively influenced, preferably by means of active heating, e.g. by means of a heating element. Said active influence may be controlled for example, it being possible for a temporal course of the control to be evaluated, preferably on the basis of a control information. It is preferably possible for said influence to be the main cause of the temporal change in the measurement variable, and therefore other influences are negligible.

It is furthermore possible, within the context of the invention, for the system parameter suggestions to each be assigned to an information particle for which at least the following information can be and/or is provided:

a particle system information, which comprises at least the relevant system parameter suggestion and/or is determined in accordance with the relevant system parameter suggestion, a particle prediction information for providing a predicted value of a future, i.e. in particular next to be determined, measurement information, the predicted value being specific for the particle prediction information in question, in particular being dependent thereon and/or being calculated on the basis of the system parameter suggestion, a particle weighting information for providing the assessment of the relevant system parameter suggestion.

In particular, each information particle is designed as a data structure which can in each case have different values for the particle system information and/or the particle prediction information and/or the particle weighting information. It is preferably possible for a model calculation for predicting the true value to be carried out on the basis of the relevant information particle. In particular, the predicted value is provided at each repetition step of the repeated execution according to step b), such that the future measurement information or the measurement information that is next to be determined is a measurement information of the kind that is determined during the measurement in the following repetition step according to step b). The information particle is used in particular for use with a particle filter, for example a Rao-Blackwellised particle filter (RBPF). This is advantageous in that particularly reliable and quick execution of the repetitions according to step b) can be carried out.

It may furthermore be possible that, for the purpose of checking according to step b), the following steps are carried out preferably in succession or in any desired sequences, the steps in particular being carried out repeatedly and/or iteratively, such that the temporal course of the measurement information is preferably determined and/or can preferably be determined:

- making a prediction of the unknown future, in particular next to be determined measurement information for each or for a selection of the information particles, such that in particular the relevant particle prediction information is determined and/or can be determined, the relevant prediction being made in accordance with the particle system information of the relevant information particle, and thus in particular being made in accordance with the relevant system parameter suggestion,
- executing the measurement such that in particular the measurement information is determined and/or can be determined,
- evaluating the system parameter suggestions by means of comparing the determined particle prediction information with the determined measurement information, such that the system parameter suggestions are assessed, preferably by means of the highest assessment being made for the strongest correspondence of the determined particle prediction information with the determined measurement information, and the assessment of the relevant information particle preferably being dependent on the level of correspondence of the relevant determined particle prediction information with the determined measurement information,
- weighting on the basis of the completed assessment, in particular in that the particle weighting information is determined and/or normalized according to the assessment.

This is advantageous in that it is possible to easily and quickly determine, on the basis of weighting, the information particle, and therefore also the system parameter suggestion, which provides the best approximation to system parameters (e.g. for forming model parameters), in order to determine the true value of the measurement variable.

It may optionally be possible that, proceeding from the weighting, in particular according to step b), the following steps are carried out, preferably in temporal succession or in any desired sequence, step b) preferably being carried out repeatedly and/or iteratively, such that the check according to step b) is and/or can be carried out again, in particular after the weighting:

- making a weighting decision on the basis of an evaluation, preferably on the basis of the completed assessment, and particularly preferably also on the basis of the particle weighting information, if this had already been determined previously (e.g. by means of adjusting the particle weighting information already available),
- determining the particle weighting information in accordance with the weighting decision, such that the assessment of the system parameter suggestions is provided.

The evaluation may take place in particular in that the correspondence of the system parameter suggestions with the true system parameters is checked by means of a prediction of the measurement information on the basis of the relevant system parameter suggestions being compared with the measurement information determined by the measurement. In this case, the "true" system parameter is in particular also understood to mean a system parameter of the kind that can be used for a model, as a model parameter, when estimating the true value of the measurement variable, in order to achieve the strongest correspondence to the true value of the measurement variable by means of said estimation. It may furthermore be possible for a weighting criterion for making the weighting decision to be selected in accordance with the model. This is advantageous in that weighting can take place in a manner adapted to the model.

It may furthermore be advantageous, with in the context of the invention, for an operating information, preferably a control information, to also be determined when executing the measurement, which operating information is preferably dependent on an operation, in particular an actuation, of the food processor and/or of an oven, and/or has a controllable influence on the measurement variable, the prediction in each case being made in accordance with the operating information and/or the measurement information last determined and/or the particle system information of the relevant information particle. The operating information relates in particular (only) to and activation and deactivation of the heating element or the heating power. For example, a model can be used for the prediction which is parameterized on the basis of the system parameter suggestions (or on the basis of the system parameter suggestion for the particle system information of the relevant information particle). For example the operating information and/or the measurement information last determined can then be used as further input values for said model. In this case, the operating information is for example an information regarding whether the controllable influence on the measurement variable is activated, e.g. whether a heating element is activated. The measurement information last determined is for example a measured value, which has been measured, of a further measurement variable that is dependent on the temporally variable (first) measurement variable. It may also be possible, for example, for the model to be selected in accordance with the operating information and/or in accordance with a further information, such as a type of food in the food processor. This allows for flexible and versatile use of the method according to the invention.

It may furthermore be possible for the following steps to be carried out, preferably in succession or in any desired sequence, while the prediction is being made:

- estimating a state of the system, in particular a dynamic process of the system, the estimate being made on the basis of a preferably stochastic model and in accordance with the particle system information of the relevant information particle, and preferably on the basis of the control information and/or the measurement information last determined,
- determining the particle prediction information in accordance with the estimated state.

For example a particle filter, in particular a RBPF, may also be used for this purpose. It is also conceivable for a sequential Monte Carlo method to be used for this purpose. It may also be possible for the prediction and/or at least one of steps a) to c) of the method according to the invention to be carried out by means of a processing apparatus, in particular by means of a plurality of processing apparatuses, e.g. at least 2 or at least 4 or at least 6 or at least 10 or at least 100 processing apparatuses. This is advantageous in that quick and reliable estimation of the state of the system is possible.

It may also be possible for at least part of the check according to step b), in particular the weighting and/or the prediction, to be executed in parallel. In particular, at least one processing apparatus is provided for this purpose, which apparatus for example comprises a plurality of processing units. The processing apparatus is for example a processor that comprises a plurality of processing units, for example processor cores. It is also conceivable for the processing apparatus to be designed as a digital signal processor or as a graphics processing unit. The parallel execution can be achieved for example in that one or more processing apparatuses carry out the checking and/or the evaluation and/or the prediction and/or the weighting in parallel, in particular for one or more information particles in each case. In this case, it is preferably possible for different processing apparatuses and/or processing units to process only different information particles, such that in particular a shared access by two or more processing apparatuses and/or processing units to the same information particle is prevented. This is advantageous in that the parallel processing can take place reliably and particularly quickly, because in particular the individual information particles are not mutually dependent (or, in other words, are mutually independent).

It may preferably also be possible for sequential adjustment of the assessment to be achieved by means of repeated execution of the check according to step b), the assessment preferably being adjusted at each repetition step (of the repeated execution), taking account of preceding assessments and on the basis of the measurement information determined during the repetition step, such that the optimal system parameter suggestion, in particular the system parameter suggestion that has the greatest relevance for the actual system parameter, is determined on the basis of the weighting, in order to achieve an optimal estimation result for the true value of the measurement variable. In this case, the optimal estimation result is preferably an estimation result that corresponds most strongly to the true value of the measurement variable. This provides in particular the advantage that the system parameter having the greatest relevance can be determined after just a short time period (e.g. at most 1 second or at most 5 seconds or at most 10 seconds or at most 30 seconds or at most 100 seconds or at most 1000 seconds) in which the repetitions are executed. The estimation can preferably be used after this time period in order to reliably determine an estimation result that is a very close approximation of the true value of the measurement variable. It may preferably be possible for the estimation to be used after this time period in order to achieve an approximation of the true value of the measurement variable on the basis of the estimation result of said estimation, which approximation is used for example for further processing steps and/or for monitoring the measurement variable.

It is furthermore conceivable for at least one first selection of different first system parameters and a second selection of different second system parameters to be provided, the first system parameters differing from the second system parameters, and in particular in step b) a first check, in particular comprising a first evaluation, being carried out for the first system parameters and a second check, preferably comprising a second evaluation, being carried out for the second system parameters, which checks are preferably carried out using different weighting logics in each case, an overall assessment for all the system parameters subsequently being made in accordance with the first and second check. In other words, it is possible for differently configured checks, e.g. also on the basis of different models, to be carried out for different system parameters. In this case, it may be possible for the second check to be dependent on a result of the first check, with the result that for example a model of the second check is parameterized on the basis of the result of the first check. It is also conceivable for further checks to be carried out, preferably carried out sequentially. It is thus possible for a check and/or evaluation and/or estimation and/or prediction to also take place in the case of complex systems and models.

It may furthermore be possible for at least 3 or at least 5 or at least 7 or at least 10 different and unknown system parameters to be provided. In particular, it may also be possible for said system parameters to be used for different models, e.g. for at least 2 or at least 4 or at least 6 different models. This allows for versatile use of the method according to the invention.

According to a further aspect of the invention, it is possible that, during the check according to step b), preferably during the evaluation, in particular during the prediction, at least one partial result may be determined and stored during at least one earlier partial evaluation, such that during a further check, in particular a further evaluation and/or a further prediction, the partial result is retrieved during a further partial evaluation, if the earlier and the further partial evaluation match and/or are similar and/or are of the same kind. In other words, it may be possible for partial results to be stored persistently or temporarily, in order that they can be used again in subsequent evaluations. Computing time can be saved thereby, and quick processing can thus take place.

It may also be possible for the measurement variable to be present at a first region, in particular a first measurement location and/or location, and for the measurement for determining the measurement information to be provided by acquiring a further measurement variable that is present at a second region, in particular location and/or measurement location, that is different from the first region and is preferably spaced apart therefrom. The spacing between the first region and the second region may preferably be at least 2 mm or at least 5 mm or at least 10 mm or at least 20 mm or at least 1 cm or at least 2 cm or at least 5 cm. The temperature at the first region preferably differs from the temperature at the second region by at least 0.1° C. or by at least 0.5° C. or by at least 1° C. or by at least 2° C. or by at least 5° C. or by at least 10° C. or by at least 100° C. In this case, a second sensor for executing the measurement is preferably provided exclusively at the second region, and therefore a sensor can in particular be omitted at the first region. The reason therefor is for example that the first region is difficult to access and arranging a sensor in said first region would result in high production costs and complex assembly. This accordingly achieves the advantage that the assembly and the design for executing the measurement can be simplified.

Furthermore, it may be possible for the measurement variable to be a temperature in the interior of an oven, in particular a baking oven, or in the interior of a microwave, or in the interior of a mixing vessel of a food processor, preferably the temperature at the surface of the base of the mixing vessel or of the oven or of the microwave. It may also be possible for the measurement variable to be a temperature in a first region, preferably in a domestic appliance.

The temperature can preferably be determined only with difficultly, since the first region is difficult to access for example, and/or no sensors are provided there. The true value of said measurement variable can then be estimated on the basis of the method according to the invention. This is advantageous in that the costs for production and assembly can be simplified.

It may likewise be possible for the measurement for determining the measurement information to be carried out by means of a sensor, in particular of the food processor and/or of an oven and/or of a domestic appliance, which sensor is preferably spaced apart from a surface of a base of a mixing vessel of the food processor (or a base of a cooking chamber of the oven), and is preferably arranged in the interior of the base or outside the mixing vessel (or cooking chamber) in the region of a heating element of the food processor (or of the oven). Alternatively or in addition, it is conceivable for a temperature-dependent resistance, preferably an NTC resistance (NTC=negative temperature coefficient), in particular of a sensor, to be evaluated in order to determine the measurement information. This significantly reduces the costs for making the measurement, and moreover ensures reliable and certain measurement.

It may furthermore be possible for an operating information to be determined by means of acquiring an operating state of a heating element. For this purpose, for example an electrical current, which is used for controlling and/or for operating the heating element, is monitored. It may also be possible for the operating information to be determined by means of a further sensor being provided and evaluated. The operating information preferably specifies whether the heating element is activated or deactivated. As a result, for example the prediction and/or the model can be parameterized, in order to achieve a more reliable result.

It is likewise conceivable for further measurement information, preferably a type and/or a temperature of a prepared food, and/or contents of a mixing vessel of a food processor, and/or a weight on the food processor, and/or a visual information relating to the food and/or to the interior of the mixing vessel, and/or further parameters on the food processor, in particular a motor current of a mixer unit of the food processor, to also be determined when making the measurement. For this purpose, for example further sensors may be provided, in particular scales and/or a camera sensor and/or an acoustic sensor and/or the like. In this case, said further measurement information may be used for example for parameterizing the check according to step b) and/or the prediction and/or the model. The reliability of the prediction and the estimation can be further increased thereby.

It may also be possible for steps a) to c) to be carried out in a real-time capable manner at least in part during the temporal change in the measurement variable, preferably during operation of a food processor (or oven). In this case it is possible in particular for steps a) and/or b) and/or c) to be carried out, in particular for the prediction and/or the weighting and/or the estimation to be carried out, at most within a period of 1 second or 10 seconds or 0.1 ms or 1 ms or 10 ms or 100 ms or 1 second. It is thereby possible to ensure that the measurement variable can be reliably monitored.

It may furthermore be possible for monitoring of the measurement variable to take place on the basis of the estimation of the true value of the measurement variable. The monitoring takes place for example such that control and/or regulation (in particular the actuation of the food processor or of the oven), for example the actuation of the heating element, takes place in accordance with an estimated value of the estimation. In this case, within the context of the invention the term actuation is also understood as a regulation. It is possible in particular for the heating element to be activated or deactivated, respectively, when the estimation result falls below or exceeds a threshold value. This allows for reliable control of the temperature in the interior of the vessel.

It may optionally be possible for the system parameter(s) to be configured in each case as at least one of the following parameters, which parameters are in particular unknown while steps a) to c) are being carried out:

a specific heat capacity, in particular of heating plate, in particular of the food processor, a power of a heating element, preferably of the food processor, a heat transfer coefficient which is preferably dependent on contents of a mixing vessel of the food processor, a mass of the heating plate of the heating element.

This is advantageous in that laborious determination of the system parameters can be omitted.

It may furthermore be possible for the system parameter suggestions to be determined and/or provided on the basis of random values at least in part. For example a random generator, in particular of the processing apparatus, is provided for this purpose. It is possible in particular for the system parameter suggestions to be different from one another in each case, such that preferably no identical system parameter suggestions are provided. This allows for efficient and quick processing of the check.

It may furthermore be advantageous, within the context of the invention, for the check according to step b), in particular the evaluation, to take place repeatedly, with at least 5 or at least 10 or at least 100 or at least 1000 repetitions, with the result that, on the basis of the assessment that is successively refined in the process, an approximation of the true value is achieved or can be achieved during the estimation, in particular in that the assessment determines, in particular during and/or following the final repetition step, the system parameter suggestion that is closest to the system parameter. In this case, it is possible in particular for the repetitions or the repetition steps to be carried out in temporal succession, the check and/or evaluation and/or prediction for different information particles and/or system parameter suggestions in particular taking place simultaneously and/or in parallel during each repetition step. This ensures particularly quick and reliable execution of the steps of the method according to the invention.

Further advantages, feature and details of the invention can be found in the following description, in which embodiments of the invention are described in detail with reference to the drawings. In this case, the features mentioned in the claims and in the description can each be essential to the invention individually or in any combination. In the drawings:

FIG. 1 is a schematic perspective view of a food processor,

FIG. 2 is a further schematic perspective view of a food processor,

FIG. 5-11 are schematic views for illustrating method steps of a method according to the invention, In the following figures, identical reference characters are used for the same technical features, even in different embodiments.

Figure 4:
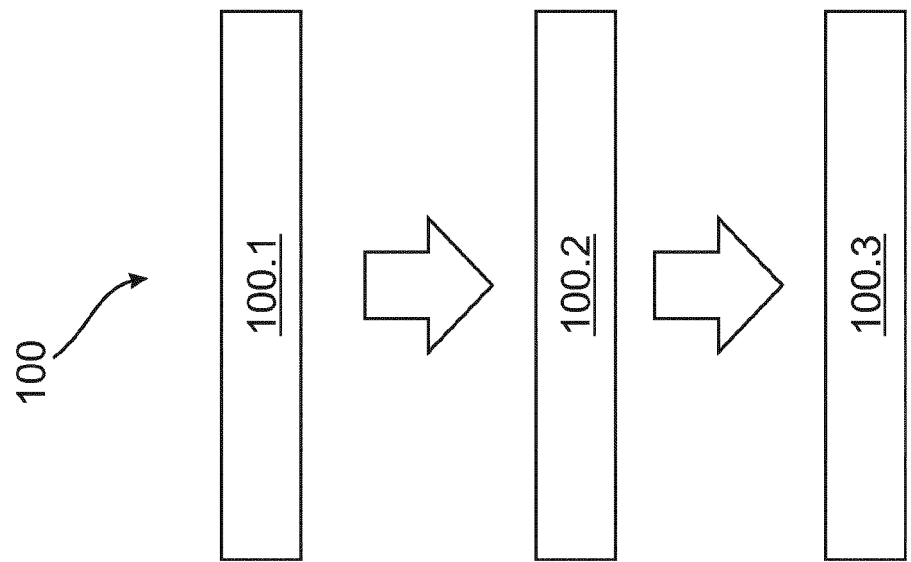
FIG. 4 is a schematic view for illustrating a method according to the invention.

FIGS. 1 and 2 are schematic views of a food processor 10. The food processor 10 comprises a housing 20 that comprises a receptacle 22 for a mixing vessel 24. In this case, the mixing vessel 24 can be closed by a lid 21 for example, and preferably comprises a handle 23. A mixer unit 51 and/or a heating element 53, in particular comprising a heating plate 53.1, and/or at least one sensor 52, preferably a temperature sensor 52, is preferably arranged in the region of the mixing vessel 24. In this case, the mixer unit 51, in particular a blade, is in particular arranged inside the mixing vessel 24. The sensor 52 is preferably arranged outside of the interior of the mixing vessel 24, e.g. in the region of the heating element 53 or of the heating plate 53.1, or on or in a mixing vessel base 24.1 of the mixing vessel 24.

The food processor furthermore comprises a control panel 26 which for example comprises a display 25, preferably a touch screen 25. In this case, the display 25 is used in particular as both an input and an output means. In this case, the control panel 26 in particular allows an operator of the food processor 10 to set and/or activate and/or deactivate, on the food processor 10, preparation parameters and/or operating parameters, such as the mixer unit speed, the heating temperature and/or the time period of the preparation, e.g. the mixing. Furthermore, it is also conceivable for a type of food to be set using the control panel 26. In this case, said user settings and/or inputs can in particular be used for determining a measurement information 210.1 and/or an operating information 210.2.

It may also be possible for recipe-related instructions or information and/or graphical control elements to be output via the display 25. Operation of the food processor 10 can be carried out using said graphical control elements, which are preferably components of a graphical user interface, as input means. It is also conceivable for an estimation result (estimated value) to be output via the display 25.

FIGS. 1 and 2 furthermore show that the food processor 10 comprises at least one working apparatus 50 which preferably comprises at least one working tool 51, such as a mixer unit 51. It may also be possible for the food processor 10 to comprise a processing apparatus 60 which for example comprises electronics components and/or a memory. The food processor 10 may likewise comprise further working apparatuses 50 and/or further sensors 52 and/or a heating means 53 and/or scales 54, which are in each case integrated in the food processor 10. The scales 54 are used in particular to acquire or to measure a weight force on the mixing vessel 24. For this purpose, the object to be weighed is for example placed and/or poured onto and/or into the mixing vessel 24. A weight value that can be determined by the scales 54 may for example also be consulted for determining the measurement information 210.1 and/or the operating information 210.2. The heating means 53 is for example designed such that the food in the mixing vessel 24 can be heated by the heating means 53, preferably up to temperatures in a range of from 10° C. to 150° C., preferably 30° C. to 120° C.

FIG. 2 furthermore schematically shows a drive 30 of the food processor 10 which comprises an electric motor 31. In this case, the drive 30 and/or the motor 31 is connected to at least one working apparatus 50 and/or to at least one working tool 51, in particular a mixer unit 51, such that force transmission takes place from the motor 31 and/or a drive shaft of the drive 30 to the working apparatus 50 and/or the working tool 51 and/or the mixer unit 51.

Figure 3:
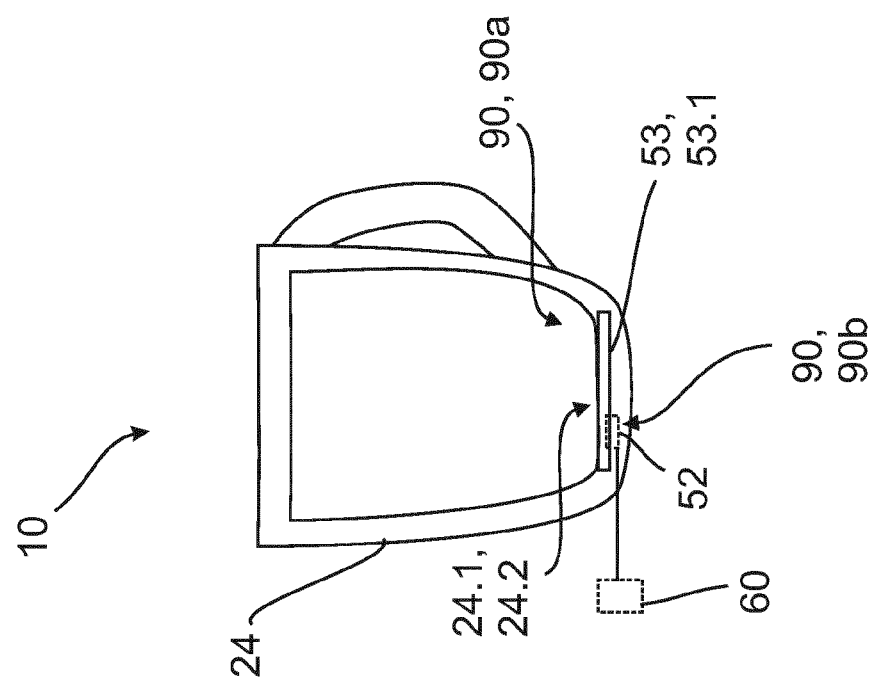
FIG. 3 is a schematic cross section through a vessel of a food processor.

Furthermore, FIG. 3 is a schematic cross section through a mixing vessel 24 of a food processor 10. It can be seen that a heating element 53, which for example comprises a heating plate 53.1, is provided on the mixing vessel 24 or in the mixing vessel 24. In this case, the heating element 53 and/or the heating plate 53.1 is used in particular for heating an interior or contents of the interior of the mixing vessel 24, in particular the heating plate 53.1 and/or the heating element 53 not coming into direct contact with the contents of the mixing vessel 24. As a result, for example a surface 24.2 of a mixing vessel base 24.1 is arranged between the heating element 53 and/or the heating plate 53.1 and the interior or the contents of the mixing vessel 24. In this case, said surface 24.2 preferably completely covers the heating element 53 and/or the heating plate 53.1 and/or a sensor 52 and/or spatially completely separates said element and/or plate and/or sensor from contents and/or an interior of the mixing vessel 24, such that the contents of the mixing vessel 24 cannot come into direct contact with the heating element 53 and/or the heating plate 53.1 and/or the sensor 52. In particular, for this purpose the sensor 52 and/or the heating element 53 and/or the heating plate 53.1 is arranged beneath the surface 24.2, in the mixing vessel base 24.1 or outside the mixing vessel base 24.1. Different regions 90, preferably of different temperatures, are provided. In particular, a first region 90*a*, at which the measurement variable is located, is provided in the interior of the mixing vessel 24 and/or on the surface 24.2 of the mixing vessel 24.1. A second region 90*b*, in which a further measurement variable is acquired by means of a measurement 130 in order to determine a measurement information 210.1, is preferably provided in the region of the sensor 52 and/or in the region of the heating element 53 and/or in the region of the heating plate 53.1 and/or inside the mixing vessel 24.1. In this case, in order to carry out the method 100 according to the invention, the sensor 52 is electrically connected to a processing apparatus 60 for example, in order in particular to transmit the measurement information 210.1 via said electrical connection. It may also be possible for the processing apparatus 60 to be electrically connected to the heating element 53 in order to electrically transmit the operating information 210.2.

FIG. 4 schematically illustrates the method steps of a method 100 according to the invention. In this case, the method 100 is used in particular for estimating 150 a temporally variable measurement variable of a system, in particular a temperature in a vessel, preferably the mixing vessel 24, preferably in a food processor 10 for at least partially automatic preparation of food. In this case, at least one measurement information 210.1 is preferably determined by means of a measurement, which measurement information differs, at least in accordance with at least one system parameter 230, from the true value of the measurement variable. In this case, the method steps 100.1, 100.2, 100.3 are carried out in order to make it possible to estimate the true value. According to a first method step 100.1, a plurality of system parameter suggestions is provided, which suggestions in each case differ from one another and each comprise a suggestion for at least one of the system parameters. According to a second method step 100.2, the system parameter suggestions are (each) checked, (or the relevant system parameter suggestions), the measurement and a weighting being carried out repeatedly on the basis of the measurement information 210.1 determined in the process, such that an assessment of the system parameter suggestions is provided. According to a further method step 100.3, the estimation is made, in particular on the basis of at least one of the system parameter suggestions, taking into account the assessment.

FIG. 5 shows that the at least one system parameter 230 influences a measurement information 210.1, because said measurement information differs, in accordance with the one system parameter 230, from the true value of the measurement variable. It may also be possible for the system parameter 230 not to have any influence on an operating information 210.2, with the result that the operating information 210.2, e.g. a control information 210.2 of the food processor, is independent of the system parameter 230. This is the case for example when the operating information 210.2 specifies whether a heating element 53 is activated or deactivated. This is dependent for example on a user input and/or a user specification (e.g. a temperature setting). The measurement information 210.1 and/or the operating information 210.2 can then be determined for example during a measurement 130. In this case, the measurement information 210.1 and/or the operating information 210.2 is used in particular as input information 210 for checking the system parameter suggestions and/or for performing the estimation 150.

FIG. 6 schematically shows the structure of an information particle 220. In this case, the information particle 220 comprises at least one particle system information 220.1, at least one particle prediction information 220.2, and at least one particle weighting information 220.3. Said items of information can in each case be determined and/or changed individually, in particular mutually independently.

FIG. 7 shows the execution of a method 100 according to the invention, by way of example. In this case, a prediction 120 of an (initially still) unknown future measurement information 210.1 is first made for each of the information particles 220, such that the relevant particle prediction information 220.2 is determined, the relevant prediction 120 being made in accordance with the particle system information 220.1 of the relevant information particle 220. Subsequently, it may be possible for the measurement 130 to be carried out, such that the measurement information 210.1 is determined. An evaluation 105 of the system parameter suggestions is then carried out, in particular by means of comparing the determined particle prediction information 220.2 with the determined measurement information 210.1, such that the system parameter suggestions are assessed. The prediction 120 and/or the measurement 130 and/or the evaluation 105 can then be repeated a few times, in order to determine as promising as possible an option for the system parameter suggestions, on the basis of the assessment. Subsequently, an estimation 150 can be made on the basis of the most promising option determined by the assessment.

FIG. 8 shows that different system parameters may also be provided, e.g. a first system parameter 230a and a second system parameter 230b, and of course also some further system parameters 230. In this case, all the system parameters 230 influence a measurement information 210.1. In this case, it may be possible for a first evaluation 105a to be carried out for a first selection of system parameters 230, e.g. for first system parameters 230a. It is also conceivable for a second evaluation 105a to be carried out for a further selection of system parameters 230, e.g. for second system parameters 230b, which second evaluation is preferably carried out only after the first evaluation 105a has been carried out (e.g. also repeatedly). It is also possible for a (repeated) check to first take place, on the basis of first system parameter suggestions, for first system parameters 230a, and for a (repeated) second check to subsequently take place for second system parameter suggestions, for second system parameters 230b. This approach makes it possible to also use complex models for the estimation 150.

Figure 9:
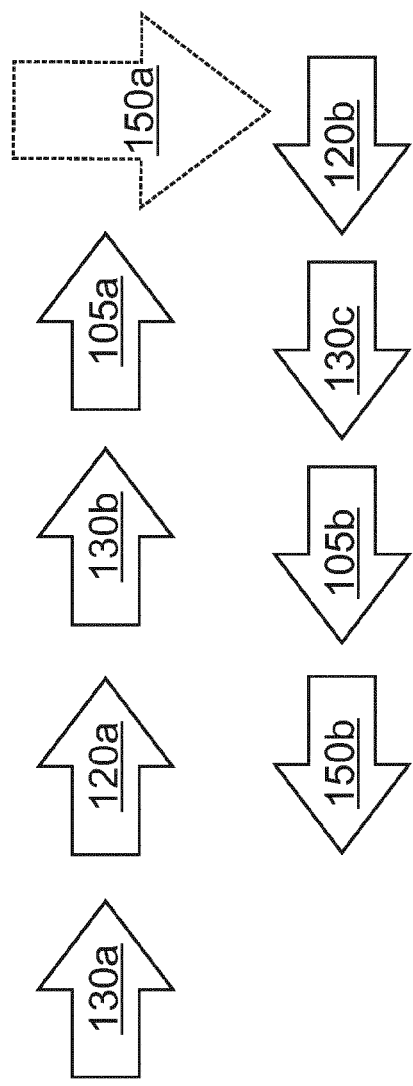

The repeated execution of the check of the system parameter suggestions is further explained on the basis of FIG. 9. Said figure shows that for example (in particular still before the first check of the system parameter suggestions) a first measurement 130a is made in order to determine at least one measurement information 210.1. The system parameter suggestions are subsequently checked in that initially a first prediction 120a is made on the basis of the relevant system parameter suggestions, and then a second measurement 130b and subsequently an evaluation 105a are carried out. During the first evaluation 105a, in particular the particle prediction information 220.2 determined during the first prediction 120a is compared with the measurement information 210.1 determined during the second measurement 130, such that the assessment of the system parameter suggestions can be made. The determination of the particle prediction information 220.2 during the first prediction 120a was determined for example on the basis of the measurement information 210.1 determined during the first measurement 130a. A first estimation 150a, for example, can take place after the assessment, it also being possible for said step to be omitted. It may therefore alternatively be possible for an estimation 150 to be made only after the repeated execution of the check. In order to repeatedly implement the check, a prediction 120 and a measurement 130 and an evaluation 105 are then carried out again in each repetition step. It is thus possible for example for a second prediction 120b to be made, and subsequently for a third measurement 130c to be made, and for a second evaluation 105b to be made in accordance with the second prediction 120b and the third measurement 130c. Following the final repetition or the final repetition step, e.g. after 10 to 100 (or 1000) repetition steps, the estimation 150 or a second estimation 150b can take place.

Figure 11:
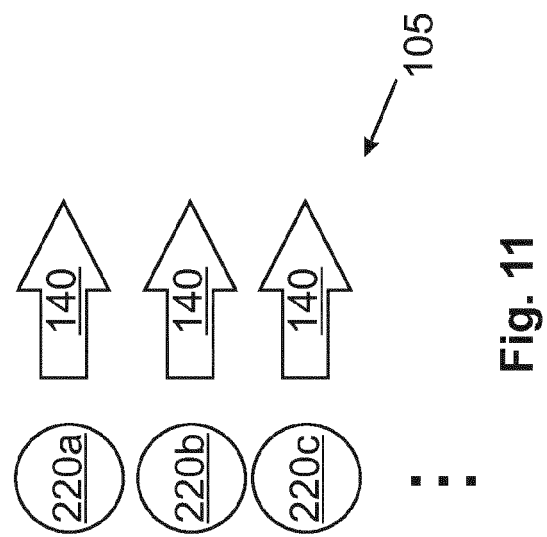
Figure 10:
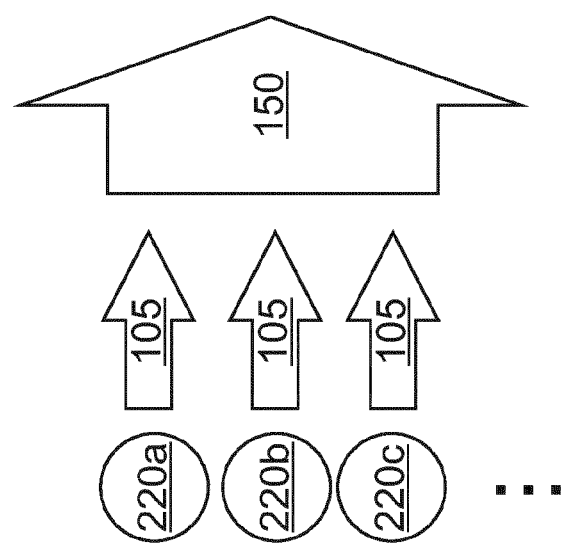

FIGS. 10 and 11 show that parallel processing of the relevant individual information particles 220 can also take place in each repetition step. For this purpose, for example an evaluation 105 is carried out in each case for a first information particle 220a and for a second information particle 220b and for a third information particle 220c, such that an (e.g. single) estimation 150 can take place on the basis of said evaluations 105. It is clear from FIG. 11 that a weighting decision 140 for each of the information particles 220 also takes place during each of the evaluations 105 in each case.

The above explanation of the embodiments describes the present invention exclusively within the context of examples. Of course, individual features of the embodiments can be freely combined with one another, insofar as technically possible, without departing from the scope of the present invention.

LIST OF REFERENCE CHARACTERS 10 food processor
20 housing
21 lid
22 mixing vessel receptacle
23 handle
24 mixing vessel, vessel
24.1 mixing vessel base
24.2 surface of the mixing vessel base
25 display
26 control panel
30 drive
31 motor
50 working apparatus
51 working tool, mixer unit
52 sensor, temperature sensor
53 heating element
53.1 heating plate
54 scales
60 processing apparatus
90 region, measurement location
90a first region, first measurement location
90b second region, second measurement location
100 method
100.1 first method step
100.2 second method step
100.3 third method step
105 evaluation
105a first evaluation 105b second evaluation
120 prediction
120a first prediction
120b second prediction
130 measurement
130a first measurement
130b second measurement
130c third measurement
140 weighting decision
150 estimation
150a first estimation
150b second estimation
210 input information
210.1 measurement information
210.2 operating information, control information
220 information particle
220.1 particle system information, system model information
220.2 particle prediction information
220.3 particle weighting information
220a first information particle
220b second information particle
220c third information particle
230 system parameter
230a first system parameter
230b second system parameter

The invention claimed is:

1. A method for estimating a temporally variable temperature of a food processor, wherein a temperature development takes place by means of heating using a heating element,
wherein at least one measurement information is determined by means of a measurement, which measurement information differs, at least depending on at least one system parameter, from the true value of the temperature,
wherein the measurement for determining the measurement information is made by a sensor of the food processor, which sensor is arranged so as to be spaced apart from a surface of a base of a mixing vessel of the food processor,
wherein the following steps are carried out for estimating the true value:
a) providing a plurality of system parameter suggestions which in each case differ from one another and each comprise a suggestion for at least one of the system parameters,
b) checking the system parameter suggestions, wherein the measurement and a weighting are carried out repeatedly on the basis of the measurement information determined here, such that an assessment of the system parameter suggestions is provided, and
c) performing the estimation on the basis of at least one of the system parameter suggestions, taking into account the assessment, and
wherein a regulation of the heating element takes place in accordance with the estimated true value, wherein the heating element is activated or deactivated, respectively, when the estimation result falls below or exceeds a threshold value.

2. The method according to claim 1, wherein the system parameter suggestions are each assigned to an information particle for which at least the following information can be provided:
a particle system information which comprises at least the respective system parameter suggestion,
a particle prediction information for providing a predicted value of a future measurement information, wherein the predicted value is specific for the respective system parameter suggestion,
a particle weighting information for providing the assessment of the respective system parameter suggestion.

3. The method according to claim 2, wherein for the purpose of checking according to step b), the following steps are performed:
performing a prediction of the unknown future measurement information for each of the information particles, such that the relevant particle prediction information is determined, wherein the relevant prediction is performed depending on the particle system information of the relevant information particle,
performing the measurement, such that the measurement information is determined,
evaluating the system parameter suggestions by means of comparing the determined particle prediction information with the determined measurement information, such that the assessment of the system parameter suggestions is effected, and
weighting on the basis of the effected assessment.

4. The method according to claim 3, wherein the following steps are performed out while the prediction is performed:
estimating a state of the system, wherein the estimation is effected on the basis of a model depending on the particle system information of the relevant information particle, and
determining the particle prediction information depending on the estimated state.

5. The method according to claim 2, wherein for the purpose of the weighting, the following steps are performed, such that the check according to step b) is carried out again:
performing a weighting decision on the basis of an evaluation, and
determining the particle weighting information depending on the weighting decision, such that the assessment of the system parameter suggestions is provided.

6. The method according to of claim 3, wherein an operating information is determined when performing the measurement, and wherein the prediction is in case effected in accordance with
at least the operating information or the measurement information last determined, and
the particle system information of the relevant information particle.

7. The method according to claim 1, wherein sequential adjustment of the assessment takes place by means of repeated performing of the check according to step b), such that the optimal system parameter suggestion, is determined on the basis of the weighting, in order to achieve an optimal estimation result for the true value of the measurement variable.

8. The method according to claim 1, wherein at least a first selection of different first system parameters and a second selection of different second system parameters is provided, wherein the first system parameters differ from the second system parameters, and wherein in step b) a first check is carried out for the first system parameters and a second check is carried out for the second system parameters, wherein an overall assessment for all the system parameters is subsequently made depending on the first and second checks.

9. The method according to claim 1, wherein at least 3 different and unknown system parameters are provided.

10. The method according to claim 1, wherein during the check according to step b), at least one partial result is determined and stored during at least one earlier partial evaluation, such that during a further check, the partial result is retrieved during a further partial evaluation, if the earlier and the further partial evaluation at least match or are similar or are of the same kind.

11. The method according to claim 1, wherein the temperature is present at a first region, and the measurement for determining the measurement information takes place by means of acquiring a further temperature that is present at a second region that is different from the first region.

12. The method according to claim 1, wherein a temperature-dependent resistance is evaluated in order to determine the measurement information.

13. The method according to claim 1, wherein an operating information is determined in that an operating state of a heating element is acquired.

14. The method according to claim 1, wherein at least further measurement information, or further parameters on the food processor, are also determined when making the measurement.

15. The method according to claim 1, wherein steps a) to c) are carried out in a real-time capable manner during the temporal change in the temperature.

16. The method according to claim 1, wherein the system parameter(s) are configured in each case as at least one of the following parameters:

a specific heat capacity, a power of a heating element, a heat transfer coefficient, a mass of the heating plate.

17. The method according to claim 1, wherein the system parameter suggestions are at least determined or provided on the basis of random values at least in part.

18. The method according to claim 1, wherein the check according to step b), takes place repeatedly, with at least 5 repetitions, with the result that, on the basis of the assessment that is successively refined in the process, an approximation of the true value is made during the estimation.

* * * * *